Figure 1:
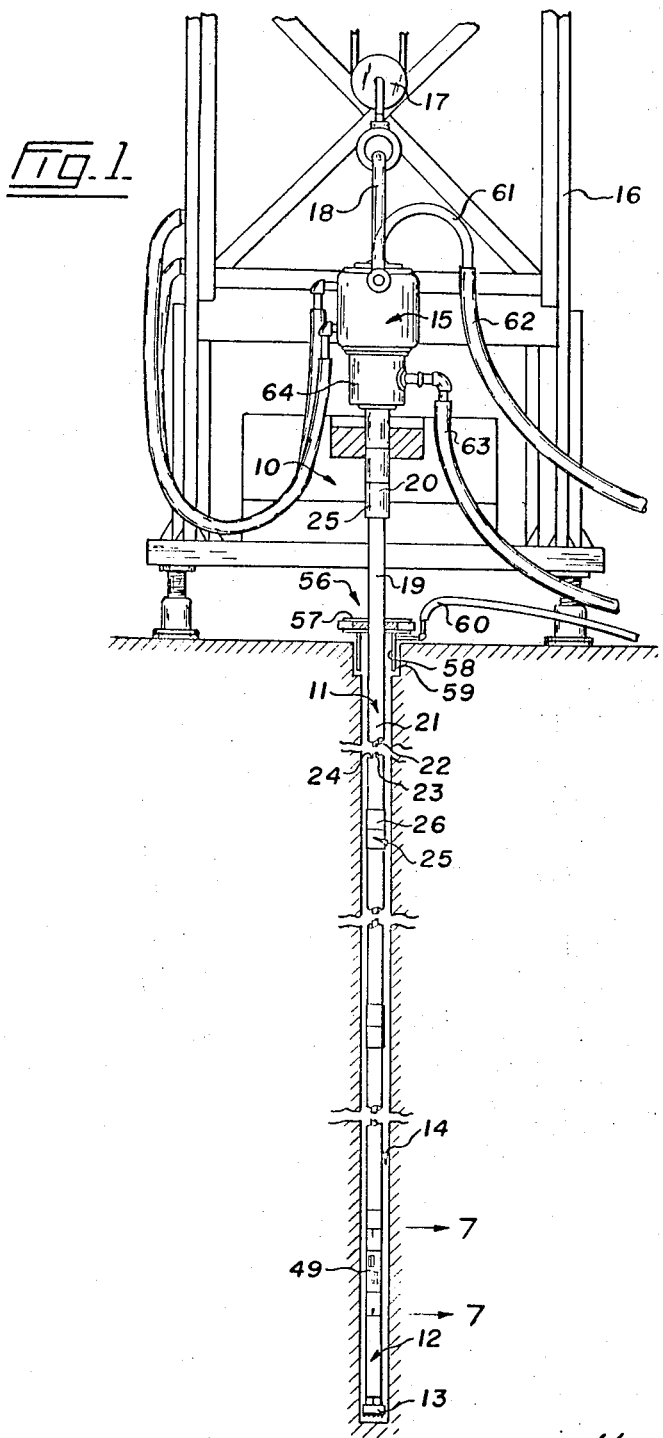
Figure 1:
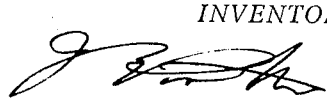

United States Patent [19]
Chapman

[11] 3,786,878
[45] Jan. 22, 1974

[54] DUAL CONCENTRIC DRILLPIPE

[76] Inventor: Harold Sherman Chapman, 501-320 7th Ave., S.W., Calgary, Alberta, Canada

[22] Filed: Dec. 14, 1971

[21] Appl. No.: 207,758

[52] U.S. Cl............... 175/320, 175/60, 175/106, 175/215, 285/133 A
[51] Int. Cl. ... F16l 15/00, F16l 39/00, E21b 43/00, E21b 2/00
[58] Field of Search..... 125/215, 212, 92, 101, 102, 125/103, 106, 320, 324, 60; 285/133 A, 133 R, 332.2, 332.3, 53, 47; 166/65

[56] References Cited
UNITED STATES PATENTS

| | | | |
|---|---|---|---|
| 3,489,438 | 1/1970 | McClure | 175/215 X |
| 3,667,555 | 6/1972 | Elenburg | 175/60 |
| 1,547,461 | 7/1925 | Steele | 175/60 |
| 2,475,635 | 7/1949 | Parsons | 285/133 A |
| 2,786,652 | 3/1957 | Wells | 175/215 X |
| 2,849,214 | 8/1958 | Hall | 175/215 X |
| 3,077,358 | 2/1963 | Costa | 175/215 X |
| 3,664,441 | 5/1972 | Carey | 175/215 |

Primary Examiner—David H. Brown
Attorney, Agent, or Firm—John E. Prothroe

[57] ABSTRACT

A dual concentric drillstring assembly for use with rotary drilling apparatus and a downhole percussion motor in which the inner and outer pipes of each stand of drillpipe are rigidly secured together by full-length welded webs for minimized reduction in the annulus and maximized heat transfer between the inner and outer members of each stand of dual-wall pipe. Each stand of dual-wall pipe is equipped with web-welded dual box-and-pin tool joints so that coupling rotation of one stand of the drillpipe will simultaneously form two fluid-tight thread-coupled joints; the outer joint is fully thread-coupled while the inner joint is thread-coupled and includes a resilient seal at the interface between adjacent pipe joints so that full make-up of the inner pipe joint is not essential for sealing. For replacement of a worn pipe joint, cutting of the single outer pipe weld permits uncoupling of the dual pipe joint from the inner and outer pipe members of a stand.

8 Claims, 8 Drawing Figures

PATENTED JAN 22 1974

3,786,878

HAROLD S. CHAPMAN
INVENTOR.

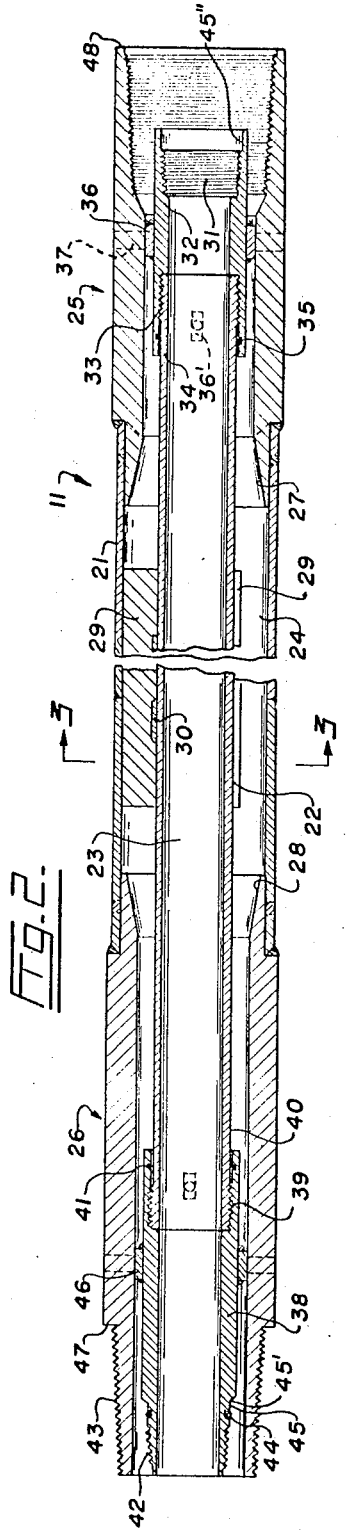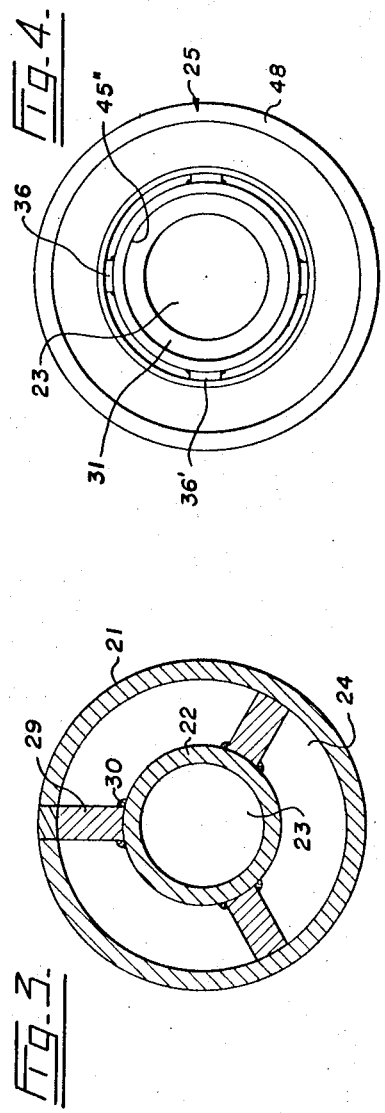

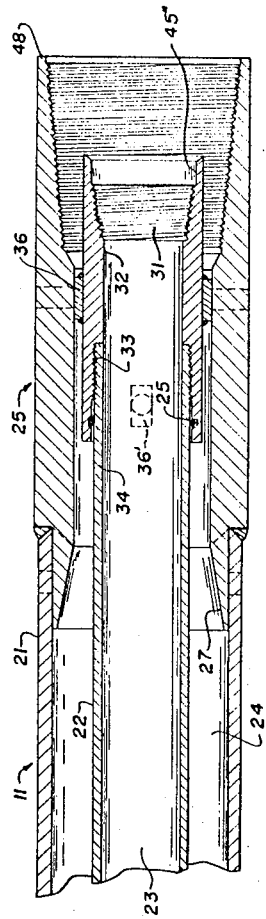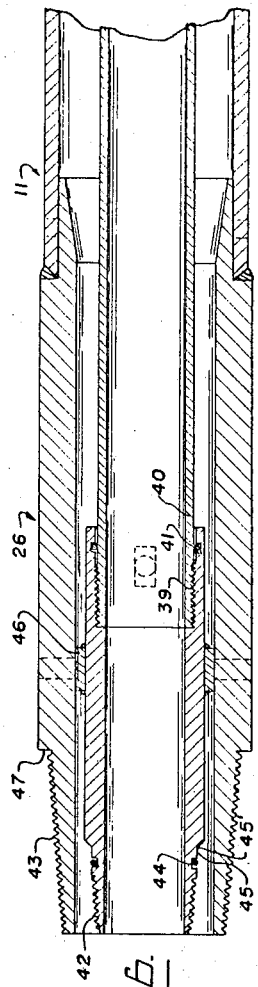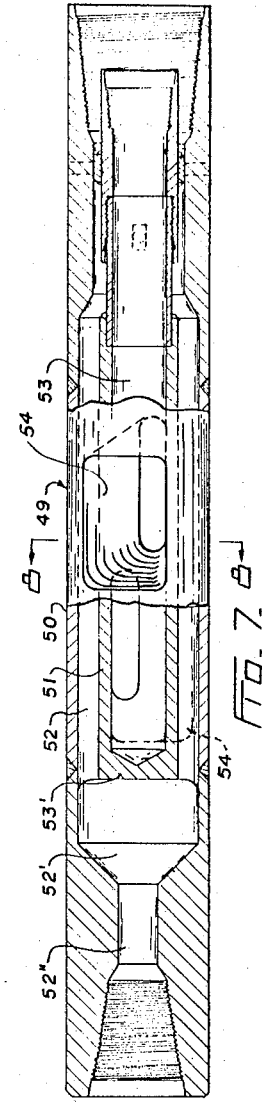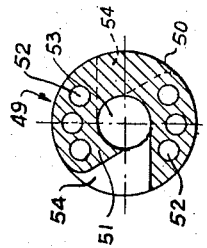

DUAL CONCENTRIC DRILLPIPE

This invention relates to new and useful improvements in borehole drilling apparatus, and, more particularly, to concentric double-wall drill-pipe, by which fluid under pressure, such as air, is circulated in the double-wall drillpipe, downwardly through the annulus, to recover cuttings from the bottom of the borehole, for transmission to the ground surface through the inner pipe.

In exploring for minerals, it has been conventional to employ various types and combinations of single-wall drillpipe, drilling fluid and drill bits, which are now described with their associated limitations:

i. A single-wall tubular drillpipe, with rotary tricone or drag bit, in which drilling fluid, normally a liquid such as water or mud, is circulated downwardly through the internal bore of the drillpipe to the bit, for recovery of rock chips at the surface, entrained with the drilling fluid, through the annulus formed between the exterior wall of the drillpipe and the base of the hole.

A fundamental fault of this method is that due to the distribution of cuttings throughout the length of the borehole, it is impossible to maintain a "clean" hole in which the formation penetrated is maintained in its natural condition for subsequent study. Additionally, cuttings become reground by the bit and intermingled in the course of their upward travel, thereby reducing the accuracy of geological analysis. Other serious limitations result from mineral and rock material being leached from the cuttings by the fluid, thus further minimizing their analytical value, while relatively large fluid pumping capacity is required in order to maintain the hole free of cuttings congestion.

ii. A single-wall tubular drillpipe, as described in case (i) above, in which compressed gas, such as air, is employed as the drilling fluid.

In addition to the shortcomings referred to in the case of liquid drilling fluids in case (i) above, this drilling method has the further limitation of loss in the surface exhaust of fines into the atmosphere as dust, which may carry significant mineral values.

iii. A rotary diamond core bit, employed with a single-wall tubular drillpipe, with liquid drilling fluid, recovering a core within a core barrel.

The principle disadvantage of this method is the relatively slow rate of drilling resulting from the use of the diamond core bit. Other limitations are the leaching of the core from the liquid drilling fluid; the hole diameter limitation resulting from rapidly increasing costs with increasing hole size; erosion of the walls of the hole from liquid flow; and the decreased recovery of mineral and geological information because of the smaller diameter holes employed.

iv. A rotary diamond cutting bit, adapted to produce rock cuttings as distinct from core recovery, otherwise as described in case (iii) above.

In addition to the shortcomings referred to in case (iii), this method has the further limitation of producing only fine grain size cuttings which are not normally useful in analysis.

In order to overcome the disadvantages inherent in the drilling methods described above, in which the interior bore of the hole is used as one conductor element in the drilling fluid circuit, the industry has developed dual-wall drillpipe, comprising inner and outer annularly spaced pipe strings forming passages through one of which drilling fluid is carried downwardly to the cutting tool where the fluid stream entrains the rock cuttings, the fluid then flowing to the top of the bore through the second passage at a velocity sufficiently high to ensure continued entrainment of all cuttings to be removed from the borehole. Thus, the wall of the bore outside of the drillstring is essentially isolated from the circulating fluid, and there exists no opportunity for contamination of the cuttings produced at the surface of the ground, permitting the recovered samples to be analyzed as representative of the formation being penetrated at any time.

Again, various types and combinations of double-wall drillpipe, drilling fluid and drill bits have become conventional, which are now described with their associated limitations:

v. A double-wall tubular concentric drillpipe with rotary tricone or drag bit, with liquid circulation downwardly through the annular space between the inner and outer tubes to the bit, and returning upwardly to the ground surface in the bore of the inner tube.

The principal fault of this method is the relatively slow rate of drilling penetration relative to hole size. In addition, chips recovered at the surface are leached by the liquid drilling fluid, thus reducing their mineral content.

vi. A double-wall tubular concentric drillpipe with percussion tricone or drag bit, and percussion impact applied to the ground surface end of the drillpipe, with resulting impact of the bit against the rock formation at the bottom of the borehole. Circulating medium may be gas, such as air, or liquid, and cuttings in the form of chips are recovered at the ground surface from the upward flow through the bore of the inner tube. The primary drawback of this method is its limitation to relatively shallow holes, because of the inertial mass of the drillstring, resulting in decreasing delivery of impact at the bit with increasing length of drillstring. Further, drillpipe life is limited due to metal fatigue resulting from the repeated percussion.

vii. A double-wall tubular concentric drillpipe with percussion core bit, and percussion impact applied to the ground surface end of the drillpipe as in case (vi) above, to provide continuous flow of core to the surface in short broken lengths through the bore of the inner tube. Circulation is provided with liquid or gas flow downwardly through the annular space between the inner and outer tubes, and upwardly to the ground surface through the base of the inner tube.

Again, the principal limitation of this method is the shallow depth restriction due to the inertial mass of longer drill-strings, and the mineral leaching of the core resulting when drilling liquids are employed.

viii. A double-wall tubular concentric drillpipe with rotary core bit, as in case (v) above, to provide a continuous flow of core to the surface through the bore of the inner tube. Circulation is provided with liquid or gas, downwardly through the annulus and upwardly through the bore of the inner tube.

The primary limitation of this method is the slower drilling penetration rate resulting from the use of rotary core bits, as opposed to percussion bits. Further, the problem referred to above of leaching of minerals in the core when liquid fluid circulation is employed, and with gaseous drilling fluids, in the case of deeper holes, excessively high gas pressures, are limitations in the method.

Deeper borehole drilling in mineral exploration became increasingly practical with the development of the downhole percussion drill, in which a percussion drilling motor, generally operated by compressed air or other gas, is secured to the lower end of the drillstring, utilizing a reciprocating hammer piston, striking against an anvil at the forward end of the tool, having chisel teeth on its face. Conventional rotary tricone or drag bits were normally employed, with rotating single-wall drillpipe, circulating gas down the centre bore of the pipe to the downhole percussion motor and returning exhaust gas and rock cuttings upwardly in the annular space between the pipe and the borehole wall. The principal fault of this equipment, however, was the large volume of high velocity gas required to entrain the rock cuttings. Further, cuttings are intermingled on the return flow, and are contaminated by contact with the borehole walls and eroding material therefrom.

The positioning of the downhole percussion drilling motor at the lower end of the drillstring did, however, point the way for drilling boreholes by means of dual string pipe, to depths limited only by the entrainment capacity of the energized drilling fluid used to power the drilling motor and to recover the cuttings produced at the bottom of the borehole.

In the operation of the dual string drillpipe with downhole percussion motor, energized drilling fluid, such as compressed gas, or liquid under pressure, is supplied at the surface of the ground to a rotary hydraulic motor or mechanical rotary drive fitted with a concentric pipe drivestem. The fluid passes into the annulus between the inner and outer tubes by way of a packing gland assembly, the fluid passing downwardly through the annular area between the inner and outer pipes and tool joints to the lower end of the drillstring, where a transfer assembly, known as a "transfer sub", above the downhole percussion motor, transfers the fluid stream to the inner tube, for delivery to the percussion motor. Energy from the fluid is then transferred to the percussion motor and bit face, where the exhausted fluid picks up the rock chip cuttings at the bit, for entrained upward flow past the percussion motor in the annulus formed between the percussion motor and the rock formation borehole wall, to the transfer sub, where the flow of fluid and entrained cuttings enters the transfer sub by means of ports in the walls thereof which deliver the fluid flow and entrained cuttings to the inner tube. The flow of cuttings and exhaust fluid then continues upwardly through the inner tube to the surface of the ground to a sample collector for examination.

Fluid pressure is maintained in the annular space between the rock formation wall of the borehole and the outer pipe, by means of a surface seal assembly, and a small downward fluid flow in this annular space, which directs the upward flow of exhausted fluid and entrained cuttings through the port in the transfer assembly into the bore of the inner concentric drillpipe.

The development of dual drillstring employing compressed gas as the recovery fluid has necessitated solving various problems in order that a gas drilling system, as outlined, may become practical. One of the major problems encountered, and particularly with respect to the drilling of deeper boreholes, is minimizing pressure losses in the gas circuit in order to ensure adequate energy delivery at the downhole percussion motor, and assuring the maintenance of sufficiently high upward gas velocities to entrain the cuttings through the course of the gas flow to the top of the borehole. This problem becomes acute in the design of pipe joints, which occur at the point of connection between successive lengths of dual drillpipe, where the cross-sectional area of the annulus must be maintained to minimize restriction in the gas flow, while at the same time developing the necessary physical strength in the pipestring to deliver torque on the drill bit and to support the pipe loads encountered in deep borehole drilling.

A further problem in the dual drillpipe heretofore known is in developing a satisfacotry seal at the joints between respective lengths of dual pipe, capable of withstanding stresses and vibrations generated in the drilling operation, and temperature stresses developed by differences in temperature between the downhole and uphole fluid circulations.

In its broader aspect, the apparatus of the present invention comprises a dual concentric drillstring assembly for use with rotary drilling apparatus, in which the inner and outer concentric drillpipes of each successive stand of the drillstring are rigidly secured together without appreciable reduction in cross-sectional area of the annulus from the connecting means between the inner and outer drillpipes, while developing adequate thermal conductivity between the inner and outer drillpipes, the joints of each stand being screw threaded for ready assembly of the drill-string, such joints developing adequate physical strength while maintaining the cross-sectional area of the annulus and sealing the respective concentric pipes against leakage of the pressurized fluid therein. As will appear, the stands are so constructed that coupling rotation of one stand of the dual-wall pipe will simultaneously form two fluid-tight thread-coupled joints between the stands, between the inner and outer pipes respectively. The joints on both the inner and outer pipes are so constructed that when unacceptable wear occurs in the joints, they may be readily detached from their associated pipestring for replacement of the joint. A particular advantage of the joint on the dual-wall drillpipe of this invention is its capacity for sealing the inner joint without dependency on the inner pipes being in a predetermined made-up position, so that the inner joint is sealed at whatever position happens to be the made-up condition of the outer threaded joint, within a relatively wide range of tolerance, while still developing the physical strength in the inner joint practically achievable only through the use of threads. Previously known dual-wall joints of similar construction have relied on a combination of threaded outer joints and telescopic inner joints in order to develop the required latitude of alignment, and to provide for differential expansion of the inner and outer pipes.

An object of this invention is to provide a dual concentric drillstring assembly, in which the inner and outer concentric pipes are rigidly secured together in unit lengths, without any appreciable reduction in cross-sectional area of the annulus from the connector assembly between the inner and outer pipes, while adequate thermal connection is developed and maintained to minimize temperature differentials between the inner and outer pipestrings, thereby minimizing internal temperature stresses in the dual pipestring assembly.

Another object of the present invention is to provide means whereby successive lengths of dual pipestring may be joined together by means of screw threads, developing adequate physical strength, while maintaining the cross-sectional area of the annulus, and sealing the respective concentric pipes against leakage of the contained pressurized fluid.

A further object of the present invention is the provision of drilling apparatus providing a rapid rate of drilling penetration with resulting low footage costs, while delivering reliable subsurface geological and mineralogical data directly related to the strata being intersected at any given moment.

A still further object of this invention is to provide drilling apparatus which is versatile in operation and adaptable to varying subsurface conditions and depths.

Yet a further object of this invention is the provision of drilling apparatus which will permit the economic drilling of a hole of sufficient cross-sectional area in order to yield a representative analysis of penetrated strata.

A still further object of this invention is the provision of drilling apparatus in which fluid energy is delivered effectively to a downhole percussion drilling motor with minimized transmission losses, low drilling fluid volumes, minimized risk of drillpipe failure at depth, at low unit operating cost.

Other and more specific objects, features and advantages of the apparatus of this invention will appear from the detailed description hereinafter following, reference being had to the accompanying drawings which form a part of this disclosure and which illustrate, merely by way of example, preferred forms of apparatus for the practice of this invention, which embodiments are illustrated in the accompanying drawings, in which:

FIG. I is a general view illustrating the complete borehole drilling apparatus, including the drillstring of this invention, surface equipment, transfer sub and downhole percussion motor;

FIG. II is an enlarged longitudinal sectional view of the dual string drillpipe of the invention;

FIG. III is a cross-sectional view of the dual string drillpipe of FIG. II, taken at line 3—of FIG. II;

FIG. IV is an end view of the dual string drillpipe of FIG. II, depicting the assembly of the drillpipe components at the box joint;

FIG. V is an enlarged fragmentary section taken longitudinally through one of the box joints;

FIG. VI is an enlarged fragmentary section taken longitudinally through one of the pin joints;

FIG. VII is a longitudinal partially sectional view of the transfer sub, taken on line 7—7 of FIG. I.

FIG. VIII is a cross-sectional view of the transfer sub, taken at line 8—8 of FIG. VII;

In the drawings, like characters of reference indicate corresponding parts in the several figures.

STRUCTURE

In the specific embodiment hereinafter described, the apparatus of this invention is used with gaseous circulating fluid, such as compressed air, which has been found to be highly satisfactory in drilling most solid mineral ground. It will be appreciated, however, that the apparatus of this invention may readily be used with other gaseous circulating fluids, liquid circulating fluids, or combinations of liquid and gaseous fluids, depending on drilling conditions encountered.

Proceeding now to describe the invention in detail, reference should be first made to FIG. I, which generally illustrates the well-drilling system including surface equipment 10, drillstring 11, percussion drilling motor 12, drilling bit 13 and borehole 14.

The drill is desirably powered by a hydraulic motor generally indicated at 15, suspended from a drilling tower 16 by means of conventional hoisting block 17 and yoke assembly 18. Power is supplied to the hydraulic motor from a conventional diesel-pump unit (not depicted).

The hydraulic drill motor imparts rotary motion to the drillstring 11 by means of the direct connection to the upper length 19 of the drillstring, at the first tool joint 20, which is of the double-threaded box-and-pin type, depicted in detail in FIG. II, which will be hereinafter described.

The drillstring 11 comprises an outer pipestring 21, and an inner concentric string 22 having an internal bore 23, and spaced from the outer string to provide an annular outer fluid passage 24. The pipestrings 21 and 22 are made up respectively of pipe stands of substantially corresponding lengths, the box joint of the inner pipe member of each stand terminating short of the termination of the box joint of the outer pipe, as will be hereinafter described.

The outer pipe members of each stands are each provided with conventional box-and-pin joint sections generally indicated at 25 and 26, welded to the upper and lower ends respectively of the outer pipe stand, as depicted in FIG. II, so that each outer pipe stand has corresponding box-and-pin joints at its upper and lower ends, respectively. As illustrated in FIGS. II, V and VI, the joints are terminally threaded to form a thread series in each joint having a diameter-reducing taper towards the ends of the pin sections of the joints and a corresponding taper on the box joints. The box-and-pin type joints are well known in the drilling industry, and achieve structural and shape characteristics which make them of peculiar adaptability to the composite drillstring of this invention when used with gaseous circulating media, by reason of both physical strength and unrestricted passage areas within the joint. By reason of the slightly increased outside diameter of the joint over the outside diameter of the outer drillpipe, it is possible to provide adequate metal for the internally threaded joint of the box members and the externally threaded joints of the pin members, without materially reducing the internal bore of the outer pipe stand, while maintaining adequate joint tensile and torsional strength to carry the drillstring load and supply rotary torque to the drill bit. Further, the slight increase in outside diameter at the joint provides a bearing surface when the drillstring is rotating within the borehole, so that abrasive wear induced by the rotating contact of the drillstring against the borehole wall will be confined to the tool joint, and will not likely occur on the tubular portion of the drillpipe. Worn tool joints can readily be replaced when wear has passed acceptable limits, in the manner hereinafter explained. The box-and-pin joint sections are also tapered at their interior ends 27 and 28, as depicted in FIG. II, in order to minimize metal fatigue which would otherwise occur at the junction of the tool joint with the pipe, and to avoid excessive fluid pressure loss at the joints, thereby assuring ultimate maintenance of downward fluid energy through the annular passage 24, to permit effective operation of the equipment at depth.

Positioned concentrically within the outer pipe stand 21, FIG. I is the inner pipe 22, of a diameter such that the cross-sectional area of the bore 23 of the inner pipe 22 is of a size adequate to permit passage of larger drilling chips, while maintaining adequate velocity in the upstream fluid flow sufficient to entrain rock cuttings produced at the bit. In a typical example of the apparatus of this invention designed for drilling to approximately 5,000 feet, the outer pipe 21 was 5-inch nominal external diameter, A.P.I. Grade D or E and the internal pipe 22 was 2-inch nominal external diameter (2.375 inches actual external diameter) A.P.I. Grade D or E.

The inner pipe 22 is centrally positioned within the bore 24 of the outer pipe 21, by means of radial webs 29, typically three in number, positioned within and spanning the annular space 24, as depicted in FIG. III, extending lengthwise substantially the full length of the pipe stand, but terminating clear of the pipe joints 25 and 26, as will be hereinafter explained. The webs 29 are welded in radial relationship to the outer surface of the inner pipe 22 over their full length, and intermittent fillet welds 30 as depicted in FIGS. II and III. It has been found, for example, that with 2-inch diameter internal pipe 23, fillet welds of 3/16 inch legs, of 2-inch length, spaced 4 inches apart, provides adequate strength and heat transfer characteristics. The radial webs 29 are then machined down to an external diameter corresponding to a press fit within the internal bore of the outer pipe 21. The inner pipe 22 with webs 29 attached is then inserted into the outer pipe 22 after heat expanding the bore of the outer pipe 22, and the webs are then slot welded to the outer pipe 21, over their entire lengths.

The joints of the inner pipe 22 are similarly of pin-and-box type, having threads of a pitch equal to the thread pitch of the joints of the outer pipe 21 so that when successive stands of the dual pipe are positioned for make-up, both outer and inner pipes will make-up together. The box joint 32 is screw-threaded at 33 to the upper end 34 of the inner pipe 22, as depicted in FIG. V, and a gas tight seal is achieved by means of the O-ring and groove assembly 35, on the inner face of the box joint 32 at its lower end. Desirably, the interior walls of the box joint 32 and the inner pipe 22 are flush, so that no pressure drop is produced by any narrowing of the bore 23 in the vicinity of the joint, as depicted in FIG. V.

Two pairs of relatively short radial webs or lugs 36 and 36' are welded to the inner box 32, the members of each pair being in 180° radial relationship, in order to anchor the box joint the inner box 25 of the outer pipe 21 to the inner box 32 by means of drilling welds 37 through the wall of the outer box 25. It has been found that by staggering the longitudinal spacing of the two pairs of radial webs 36 and 36' relative to the outer box 25, as depicted in FIG. II, further unnecessary reduction in cross-sectional area of the annulus at the critical joint region is avoided. Additionally the staggered location of the webs 36 and 36' provides stability during assembly of the respective box members 25 and 32, and reduces the effect of residual weld stresses on the box members.

Turning now to the lower end of the interior pipe 22, a pin joint 38 is threaded at 39 onto the lower end 40 of the interior pipe 22, in each stand and made similarly gas tight by means of an O-ring and groove assembly 41 on the inner surface of the pin joint 38 at its upper end. Threads 42, having matching pitch with the threads 43 of the outer pin joint 44, are formed on the lower end of the pin joint 38, which is so positioned within the dual string that the lower ends of the pin joints 38 and 43 of the inner and outer pipes 22 and 21 respectively, are substantially flush, as depicted in FIGS. II and VI.

The length and disposition of the assembled inner pipe 22 and box joint 32 is such that the upper end of the box joint 32 will be depressed below the upper end 48 of the box joint on the outer pipe 21, as depicted in FIG. II, for reasons which will be hereinafter explained.

An O-ring 44 and groove assembly 45 is positioned on the outer circumference of the inner pipe pin joint 38, disposed above the threads 42, in order to effect a gas seal against a cylindriform portion of the internal wall of the bore of the inner pipe box joint 32 of the next successive stand of dual string pipe, as will be hereinafter further described. Radial webs 46 are welded between the outer walls of the pin joint 38 and the inner wall of the pin joint 43, in the same fashion as the radial webs located at the box end of the dual string pipe, heretofore described.

During make-up, when it is desired to add a subsequent stand of dual-wall pipe to the upper end of the string during downhole progression of the drilling operation, the outer pipe pin joint of the pipestand to be added to the string is introduced into the outer pipe box joint of the last pipestand member of the drillstring at the ground surface. Because the box joint 32 of the inner pipe 22 is positioned substantially below the distal end 48 of and within the outer pipe box joint 25, and the threads on the outer pipe box-and-pin joints 25 and 38 are immediately engaged, the successive pipe stands are brought into mutual alignment before the inner pipe box-and-pin joints 26 and 32 become engageable, thus facilitating make-up. It has been found desirable that a depression of the distal end of the inner pipe box joint below the distal end of the outer pipe box joint, of the order of one diameter of the inner pipe will ensure sufficient make-up of the outer pipe box-and-pin joints of adjacent pipe stands and resulting alignment thereof, before engagement of the inner pipe box-and-pin joints thereof.

By virtue of the construction described, the outer pipe seal is accomplished by full make-up of the outer pipe box-and-pin joints, whereby the shoulder 47 of the outer pipe pin joint 43 is threaded to contact the butt end 48 of the box joint on the next successive stand of the dual string pipe. The inner pipe seal is accomplished by the combination of the threaded pin-and-box joint and the O-ring 44 which registers against the inner bore of the box joint 32. Adequate thread length is provided on the threads 42 of the inner pipe pin joint 38, so that full make-up of the outer pipe pin-and-box joint will occur before full make-up of the inner pin-and-box joint occurs, thereby assuring full sealing of the outer pipe box-and-pin joints of adjacent stands of drillpipe, the inner joint sealing thereof being completed by an O-ring seal assembly 44.

The O-ring groove of the O-ring seal assembly 44 is machined into a cylindriform surface 45°, on the outer surface of the inner pipe pin joint 38 immediately adjacent the upper end of the external threaded portion 42, as depicted in FIG. VI. Registering with the O-ring seal assembly 44, a cylindriform O-ring seal face 45" is machined onto the inner surface of the inner pipe box joint 32 between the distal end of the box joint 32 and the commencement of the internal threaded portion 31, as depicted in FIG. V; the internal diameter of the cylindriform O-ring seal face 45" of the box joint 32 makes a sliding fit with the external diameter of the registering cylindriform surface 45' of the pin joint 38. With this construction makeup tolerance of the inner box-and-pin joint is provided, the O-ring 44 of the inner pipe pin joint 38 being ensured of registering against some portion of the internal surface of the O-ring seal face 45", when the outside pipe box-and-pin joints 25 and 26 respectively are fully made-up. It will of course be understood in the foregoing description of the make-up of pin-and-box joints, that when reference is made to the inter-engagement of various parts of a box joint with a pin joint, such refers to box joints and pin joints of separate stands of dual-wall pipe, interconnecting in end-to-end pin-to-box fashion.

A downhole percussion motor 12, is connected to the bottom stand of the dual drillpipe 11, by means of transfer sub 49, depicted in FIGS. I and VII, the general construction of which will be explained briefly. The function of the transfer sub is to transfer the exhausted air and entrained cuttings from the bottom of the bore 14, which move upwardly in the annular space between the exterior of the percussion motor 12 and the walls of the bore hole, into the bore 23 of the interior pipe 22, for delivery to the surface. The transfer sub 49 consists essentially of a cylindrical machining 49, having longitudinal passages 52 for downward flow of the energized drilling fluid, and interiorly thereof, and upward passage 53 for the exhausted drilling fluid and entrained cuttings, in which the upper end of the transfer sub is equipped with a threaded dual-wall box joint, identical to the box joint hereinabove described for the dual-wall drill-pipe, for threaded connection to the dual-wall pin joint of the lower end of a stand of dual-wall drillpipe, and in which the bottom end of the transfer sub comprises a single passage interiorly threaded tool joint of standard design well-known in the drilling industry, for connection to the upper end of the downhole percussion motor 12, a plurality of ports 54 being provided through the dual walls of the transfer sub, to establish communication between the bore 53 of the transfer sub and the exterior space 14 surrounding the transfer sub, such ports being isolated from the fluid passages 52 by means of the port walls. The internal bore 53 of the transfer sub is dead-ended adjacent the lower end of the transfer sub at 53', and the passages 52 communicate with the internal bore 52', which in turn communicates with the lower discharge passage 52" of the transfer sub, which is screw-threaded for connection to the motor 12, as depicted in FIGS. I and VII. The transfer sub 49 is more fully described in the Chapman U.S. application, Ser. No. 207,785, filed Dec. 14, 1971, on "Drilling Apparatus for Dual Passage Drillpipe."

A conventional downhole percussion motor generally indicated at 12, typically of the piston-and-anvil type, is threaded to the lower end of the transfer sub 49, as depicted in FIG. I, and a percussion bit 13 is secured to the lower end of the percussion motor, for contact with the rock at the bottom of the bore hole.

The uphole flow of cuttings into the transfer sub is achieved by maintaining gas pressure in the annular area between the outer pipe 21 and the bore 14 by way of a surface seal assembly depicted generally in FIG. I at 56. This surface seal assembly consists of a conventional stuffing box member 57, welded to a short length of surface casing 58, cemented in position at the surface as at 59, in FIG. I. The surface seal assembly is provided with a small downward air flow by means of the air pressure connection 60, FIG. I.

A cuttings flow gooseneck connection 61 is connected to the top discharge outlet of the hydraulic motor assembly 15, and discharges into a cuttings recovery hose 52, leading to a cuttings recovery container (not depicted).

Compressed air is provided for operation of the downhole apparatus by means of an air line 63, and stuffing box depicted generally at 64, communicating with the annular space 24 between the outer and inner pipe components of the dual pipe string.

OPERATION

In considering the operation of the apparatus, the equipment will be assumed to be set up as illustrated in FIG. I, with a compressor providing compressed air or other gas to the air line 63 and stuffing box 64, where the gas will flow downwardly through the annular bore 24, throughout the full length of the drillstring, passing through the annular area 52 of the transfer sub, for delivery to the downhole percussion motor 12, thereby operating the motor for reciprocating percussion action of the bit 13 against the rock face of the bore hole 14. The combined rotary and percussion action of the bit on the rock face operates to rapidly penetrate the formation, reducing the rock encountered to chips and cuttings of a size sufficient to enable them to be swept up by the exhaust gas from the motor 12 discharged from the bit 13, radially outwardly across the bottom of the bore hole, and upwardly in the annular space between the downhole percussion motor 12 and the walls of the bore hole, to the entry ports 54 in the transfer sub, for delivery to the internal bore 53 of the transfer sub and then upwardly through the internal bore 23 of the drill pipe 22, to the above-ground gooseneck connection 61, and cuttings recovery hose 62, where the cuttings are collected for examination.

In the drilling of deeper holes, it has been found that it is possible to maintain within the annular space 24 and the internal bore 23, a sufficiently high velocity of gas flow to operate the downhole motor 12, and to assure continued entrainment of the cuttings throughout the course of the gas flow to the surface of the ground.

From the foregoing, it will be understood that during the drilling operation, the gaseous fluid circulation is entirely confined to the dual passages within the drillstring and as a result no circulation flow occurs within the bore hole outside of the drillstring and in contact with the wall of the borehole. As a consequence, the bore walls and rock formation at the bit remain in a relatively uncontaminated condition, thereby assuring that the cuttings produced at the surface correctly represent the composition of the structure being penetrated by the bit at any given time.

If for any reason, such as plugging by congestion of the upward passage of the cuttings passages, it becomes necessary to reverse the circulation of the gas throught the drillstring, the compressor discharge may be disconnected from line 63, and connected to the cuttings recovery line 62, and reverse fluid circulation maintained until the obstruction is removed.

Reference has been made previously to the importance of the drill-string make-up and construction, to ensure that the cross-sectional areas of the flow passages provide minimum restriction to the flow of gas downwardly, and gas and entrained cuttings upwardly. In the apparatus of this invention, this has been accomplished by the design of the radial webs 29 and 36 and 36' and 46 connecting the inner and outer pipes 21 and 22 over their full lengths and the inner and outer members of the box-and-pin joints, thus providing rigid construction for delivery of torque to the bit, and physical strength for the support of a long drillstring, while minimizing interference in the annular passages. Additionally, by virtue of the continuous length of the radial webs 29, extending the full length of each stand of dual pipe, heat transfer between the upwardly and downwadly passing fluids is readily accomplished, thereby minimizing the effects of temperature stresses which would otherwise arise from expansion differentials in the two concentric pipes.

When unacceptable wear has occurred at any of the joints, either in the body of the joint through abrasion against the wall of the borehole, or in the threaded portions, replacement of the joint is readily achieved by cutting the weld between the outer pipe 21 and the worn outer pipe pin-and-box joint, 26 or 35 respectively, and then rotating the entire joint relative to the pipestring, so that the threaded joint 33 or 39 becomes uncoupled for replacement; breaking of the welds securing the lugs 36 and 36' is thus unnecessary in joint replacement in the dual-wall drillpipe of of this invention.

Since various modifications can be made in apparatus of this invention, as hereinabove described, and in many apparently widely different embodiments of the same made within the spirit and scope of the claims without departing from such spirit and scope, it is intended that all matters in the accompanying specification shall be interpreted as illustrative only and not in a limiting sense.

What I claim as my invention is:

1. A dual-wall drilling string comprising, in combination:
   i. a series of stands of dual-wall metallic pipe interconnectible in en-to-end relationship to form a drilling string, said stands each including an outer pipe member and an inner pipe member rigidly secured to and in coaxial spaced relationship with said outer pipe member and defining an internal longitudinal bore and an annular longitudinal passage surrounding said longitudinal bore and isolated therefrom;
   ii. box joints on a first end of each of said interconnected inner and outer pipe members of each such stand;
   iii. pin joints on a second end of each of said interconnected inner and outer pipe members of each such stand;
   iv. threaded portions on the distal ends of each of said box joints and said pin joints having similar threads of equal thread pitch and adapted to permit simultaneous make-up of said outer and inner pipe members of a pair of stands of said dual-wall metallic pipe in end-to-end relationship, the threaded portion on said outer pipe box member of a first stand co-operating with the threaded portion on the outer pipe pin member of an interconnectible second stand to engage in fully made-up condition before the fully madeup condition of the inner pipe box member of said first stand with the inner pipe pin member of said second stand; and
   v. resilient sealing means between said inner pipe box member of said first stand and said inner pipe pin member of said interconnectible second stand; and successive stands of said drillpipe being thereby adapted to couple in end-to-end relationship to form a continuous drillstring having a continuous longitudinal bore and a continuous longitudinal annular passage surrounding said longitudinal bore and isolated therefrom.

2. Dual-wall drilling string as defined in claim 1, additionally including in each of said stands of dual-wall metallic pipe a plurality of metallic radial webs rigidly interconnecting said inner and outer concentric pipes of each of said stands and extending longitudinally within each of said annular longitudinal passages for substantially in full length thereof.

3. Dual-wall drilling string as disclosed in claim 1 in which:
   i. the box joint on the first end of said outer pipe member comprises a tubular outer pipe box joint member having internal threads thereon;
   ii. the box joint on the first end of said inner pipe member comprising a tubular inner pipe box joint member adjacent said outer pipe box joint member, having internal threads thereon of a thread pitch equal to the pitch of said internal threads on said outer pipe box joint member, said outer pipe box joint member and said inner pipe box joint member defining an annular box joint fluid passage therebetween communicating with said annular longitudinal passage;
   iii. the pin joint on the second end of said outer pipe member comprising a tubular outer pipe pin joint member having external threads thereon adapted to register with the internal threads of said outer pipe box joint member;
   iv. the pin joint on the second end of said inner pipe member comprising a tubular inner pipe pin joint member adjacent said outer pipe pin joint member and having external threads thereon adapted to register with the internal threads of said inner pipe box joint member, said outer pipe pin joint member and said inner pipe pin joint member defining an annular pin joint fluid passage therebetween communicating with said annular longitudinal passage.

4. Dual-wall concentric drillpipe as disclosed in claim 3 in which:
   i. said outer pipe box joint member and said inner pipe box joint member are rigidly secured together by a plurality of metal lugs radially spanning said annular box joint fluid passage; and
   ii. said outer pipe pin joint member and said inner pipe pin joint member are rigidly secured together by a plurality of metal lugs radially spanning said annular pin joint fluid passage.

5. Dual-wall concentric drillpipe as disclosed in claim 1 additionally including an inner pipe pin joint O-ring seal assembly on the outer surface of said inner pipe pin joint member; and a cylindrical O-ring seal face on the inner surface of said inner pipe box joint member adapted to register with the inner pipe pin joint O-ring seal assembly of a connecting similar stand of dual-wall concentric drillpipe.

6. Dual-wall concentric drillpipe as disclosed in claim 1 in which said outer pipe box joint member and said outer pipe pin joint member are each welded to said outer pipe; and additionally comprising thread means securing each of said inner pipe box joint members and said inner pipe pin joint members to said inner pipe.

7. Dual-wall concentric drillpipe as dislcosed in claim 1 in which said outer pipe box joint member and said outer pipe pin joint member are each welded to said outer pipe; and additionally comprising thread means securing each of said inner pipe box joint member and said inner pipe pin joint member to said inner pipe; and additionally comprising resilient sealing means on the interfaces between said inner pipe box joint member and said inner pipe pin joint member, respectively, and said inner pipe.

8. Dual-wall concentric drillpipe as disclosed in claim 1 in which said inner pipe box joint member of each stand of said drillpipe is disposed in coaxial spaced relationship with said outer pipe box joint member thereof so that the distal end of said inner pipe box joint member is displaced substantially longitudinally inwardly from the distal end of said outer pipe box joint member thereof; and in which said inner pipe pin joint member of each stand of drillpipe is disposed in coaxial spaced relationship within said outer pipe pin joint member thereof so that the distal end of said inner pipe pin joint member is substantially coplanar with the distal end of said outer pipe pin joint member thereof, thereby effecting engagement of the internal threads of said outer pipe box joint member of a first stand of drillpipe with the external threads of the outer pipe pin joint member of a similar second stand of drillpipe connecting therewith before engagement of the internal threads of said inner pipe box joint member of said first stand of drillpipe with the external threads of the inner pipe pin joint member of said second stand of drillpipe.

* * * * *